US 6,944,449 B1

(12) United States Patent
Gandhi et al.

(10) Patent No.: US 6,944,449 B1
(45) Date of Patent: Sep. 13, 2005

(54) METHOD AND SYSTEM FOR CONTROLLING ACCESS OF A SUBSCRIBER STATION TO A WIRELESS SYSTEM

(75) Inventors: Asif Dawoodi Gandhi, Summit, NJ (US); Joe Huang, Parsippany, NJ (US); Marc Benedict Ibanez, San Lorenzo, CA (US); Lei Song, Woodbridge, NJ (US); Mathew Thomas, Scotch Plains, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 835 days.

(21) Appl. No.: 09/580,648

(22) Filed: May 30, 2000

(51) Int. Cl.[7] .............................................. H04Q 7/38
(52) U.S. Cl. ....................... 455/425; 455/453; 455/515
(58) Field of Search ........................ 455/450, 452–453, 455/509, 425, 435.1, 434, 63.1, 435.2, 515

(56) References Cited

U.S. PATENT DOCUMENTS

| | | | | |
|---|---|---|---|---|
| 5,490,087 | A | * | 2/1996 | Redden et al. .............. 455/427 |
| 5,796,722 | A | | 8/1998 | Kotzin et al. |
| 5,838,671 | A | * | 11/1998 | Ishikawa et al. ............ 370/335 |
| 6,122,516 | A | * | 9/2000 | Thompson .................. 455/450 |
| 6,195,554 | B1 | * | 2/2001 | H'mimy ..................... 455/450 |
| 6,223,041 | B1 | * | 4/2001 | Egner et al. ............. 455/452.2 |
| 6,266,525 | B1 | * | 7/2001 | Peterson .................... 455/410 |
| 6,484,145 | B1 | * | 11/2002 | Home et al. ................... 705/8 |
| 6,603,745 | B1 | * | 8/2003 | Antonio et al. ............. 370/318 |

FOREIGN PATENT DOCUMENTS

| | | | |
|---|---|---|---|
| EP | 1161113 A2 | * 12/2001 | ............ H04Q 7/38 |
| WO | WO 98/31177 | 7/1998 | |

OTHER PUBLICATIONS

Liu, Zhao et al. "SIR-Based Call Admission Control for DS-CDMA Cellular Systems." *IEEE Jorunal on Selected Areas in Communications*, vol. 12, No. 4, May 1994; pp. 639-644.

* cited by examiner

*Primary Examiner*—Nick Corsaro
*Assistant Examiner*—Brandon J Miller

(57) ABSTRACT

A method for controlling access of a subscriber station to a wireless communications system facilitates the maintenance of a performance target of the reverse link and desired geographic coverage of the reverse link. The method for controlling access of a subscriber station to a wireless communications system includes measuring a first performance indicator and a second performance indicator for a reverse link associated with a subscriber station seeking access to a wireless communications system. A blocking threshold value is established based upon the measured second performance indicator and may be adjusted to allow more or less blocking based on any additional metrics that characterize the performance of the current subscriber stations. The decision to grant or deny access of the subscriber station to the wireless communications system is determined based on a comparison of the measured first performance indicator to the established blocking threshold value.

24 Claims, 6 Drawing Sheets

METHOD AND SYSTEM FOR CONTROLLING ACCESS OF A SUBSCRIBER STATION TO A WIRELESS SYSTEM

FIELD OF THE INVENTION

The present invention relates to a method and system for controlling access of a subscriber station to a wireless communications system.

BACKGROUND

The performance and coverage of a wireless communications system (e.g., a code-division multiple access system) depends upon the amount of interference in the relevant frequency band. Sources of interference may include the wireless communications system itself and external sources of electromagnetic energy. For example, transmission of mobile stations on the reverse link or the base station on the forward link may generate interference. Interference at a base station of a wireless system reduces reverse link coverage and/or reliability. Accordingly, a base station may improperly drop a call of a subscriber station, a subscriber station may experience low voice quality or a high frame error rate, and a subscriber station may have an increased access failure rate. Thus, a need exists for a method for controlling reverse link access to address the aforementioned problems.

SUMMARY OF THE INVENTION

In accordance with the invention, a method and system for controlling access of a subscriber station to a wireless communications system facilitates the maintenance of a performance target (e.g., statistical reliability) of the reverse link and desired geographic coverage of the reverse link. The method and system for controlling access of a subscriber station to a wireless communications system includes measuring a first performance indicator and a second performance indicator for a reverse link of a base station that a subscriber station is seeking to access. A blocking threshold value is established based upon the measured second performance indicator. In one embodiment, the system decides to grant or deny access of the subscriber station to the wireless communications system based on a comparison of the measured first performance indicator to the established blocking threshold value. In another embodiment, the system may decide to grant or deny access of the subscriber station to the wireless communications system based on a comparison of the first performance indicator, the second performance indicator, or both to one or more corresponding blocking threshold values. Advantageously, the blocking threshold may be adjusted to allow more or less blocking (of access of the access-seeking subscriber station) based on any additional metrics that characterize the performance of the currently active subscriber stations.

DETAILED DESCRIPTION OF THE PREFERRED EMBODIMENTS

Figure 1:
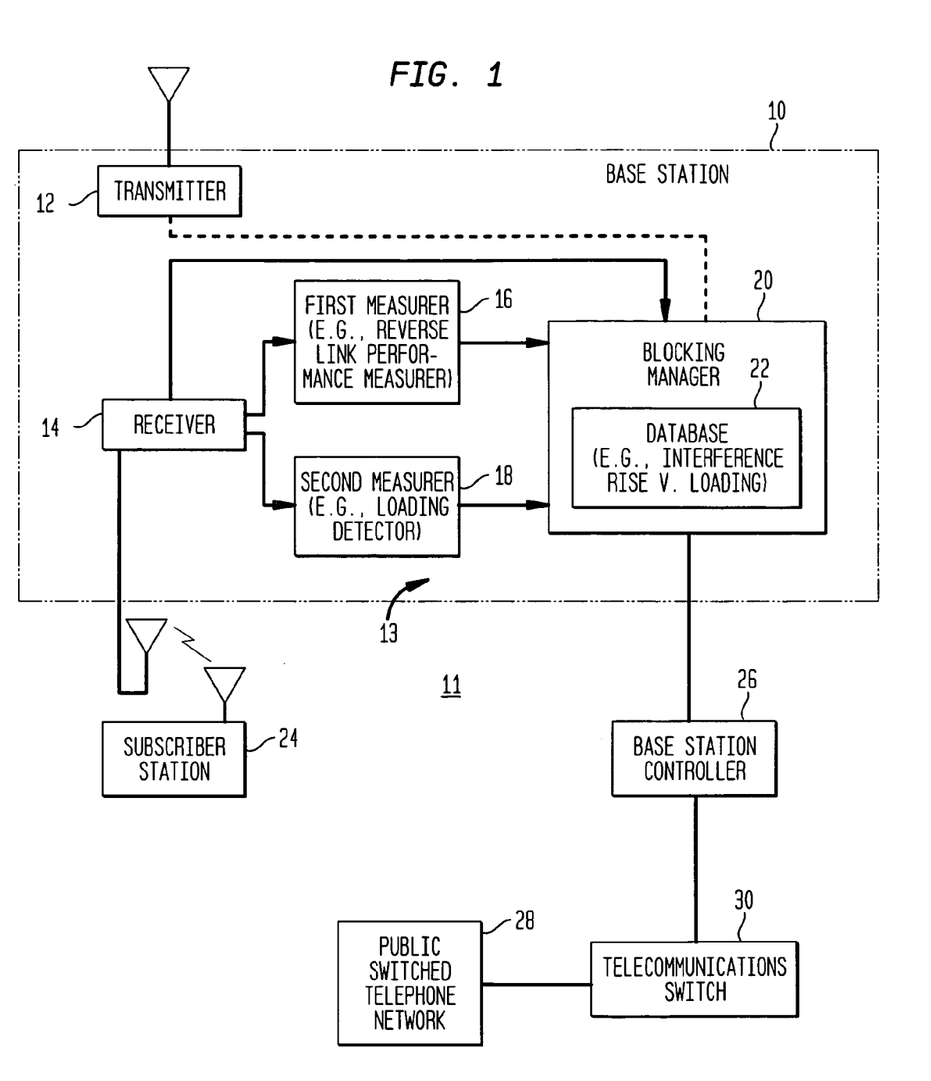
FIG. 1 is a block diagram of an illustrative system for controlling access of a subscriber station to a wireless communications system in accordance with the invention.

In accordance with the invention, FIG. 1 shows a block diagram of an access control system 13 for controlling access of a subscriber station 24 to a wireless communications system 11 to maintain reliability of the communications services provided to other subscriber stations (not shown) already using the wireless communications system 11. The wireless communications system 11 includes a base station 10 coupled to a base station controller 26. In turn, the base station controller 26 is coupled to a telecommunications switch 30, which may provide access between the wireless communications system 11 and a public switched telephone network 28.

In the embodiment shown in FIG. 1, the access-control system includes a first measurer 16 for measuring a first performance indicator (e.g., interference rise on a reverse link of the base station 10) and a second measurer 18 for measuring a second performance indicator (e.g., loading on the base station 10). For example, the first measurer 16 may comprise a reverse link performance measurer and the second measurer 18 may comprise a loading detector. Although the second measurer 18 is shown as an integral portion of the base station 10, in an alternate embodiment the second measurer 18 may be located elsewhere, such as in the base station controller 26 or in the telecommunications switch 30.

The subscriber station 24 transmits an access request (e.g., access probes) to gain access to the wireless communications system 11. A receiver 14 of the base station 10 may receive the access request. The receiver 14 is coupled to the first measurer 16 for measuring first performance indicator.

In one embodiment, the first performance indicator represents an estimated interference rise on the reverse link from granting access to the subscriber station 24. The estimated interference rise is based on one or more measurements of the transmission (e.g., access request) from the subscriber station 24 to the base station 10. In one embodiment, the second measurer 18 detects the loading of the channels served by the base station 10. The loading may be defined as the number of active channels of the base station 10 divided by the total number of available communication channels on the air interface of the base station 10.

The first measurer 16 and the second measurer 18 provide a first performance indicator and a second performance indicator that represent contemporaneous or time-related measurements for the subscriber station 24 seeking access to the base station 10. The first measurer 16 and the second measurer 18 output the first performance indicator and the second performance indicator to the blocking manager 20.

The blocking manager 20 references a database 22, which may store a desired relationship of the first performance indicator versus the second performance indicator (e.g., interference rise versus loading). The blocking manager 20 decides whether to grant access of the subscriber station 24 to the base station 10 or the wireless communications system 11 based on a comparison of the first performance indicator and the second performance indicator to the desired relationship. For example, the first performance indicator is compared to a blocking threshold of the desired relationship, where the second performance indicator determines the selection of an appropriate value of the blocking threshold. If the blocking manager 20 decides to grant access of the subscriber station 24 to the wireless communications system 11, the access approval is transmitted to the subscriber station 24 over transmitter 12.

In another embodiment, access-control system may decide to grant or deny access of a subscriber station to the wireless communications system based on a comparison of the first performance indicator, the second performance indicator, or both to one or more corresponding blocking threshold values. For example, the measured first performance indicator could be compared to an interference rise threshold value and the measured the second performance indicator could be compared to a loading threshold value to determine whether to grant access to a subscriber station to the base station. Access could be granted (e.g., by a blocking manager) if both the interference rise threshold value and the loading threshold value were met.

Figure 2:
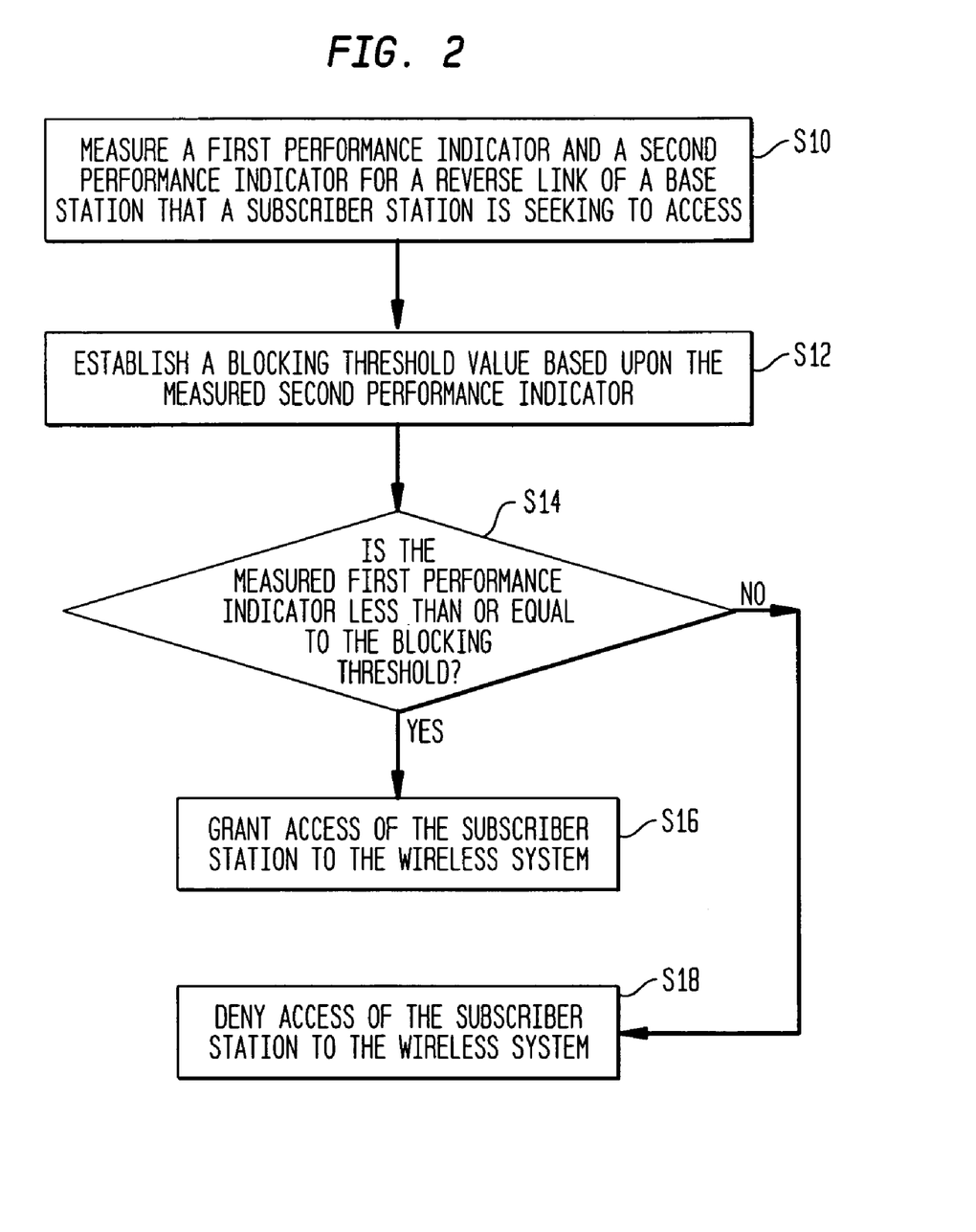
FIG. 2 is a flow chart generally illustrating a method for controlling access of a subscriber station to a wireless communications system in accordance with the invention.

In accordance with the invention, FIG. 2 shows a method for controlling access of a subscriber station 24 to a wireless communications system 11. The method represents a call admission policy. An appropriate call admission policy facilitates meeting a desired level of signal quality or statistical reliability over a defined geographic coverage area for the reverse link of the currently active users.

The method of FIG. 2 starts in step S10, in which a base station 10 measures or obtains a first performance indicator and a second performance indicator for a reverse link of a base station 19 to which a subscriber station seeks access. The subscriber station seeks to access the wireless communications system 11 by transmitting an access request or access probes on the reverse link to the base station 10. The first performance indicator generally includes interference rise (i.e., receive signal strength indicator rise from interfering subscriber stations) over the background noise floor. The background noise floor includes thermal noise and other electromagnetic noise in the receive bandwidth of the base station 10. The second performance indicator generally includes loading level of a base station through which the subscriber station 24 seeks access to the wireless communications system 11. The second performance indicator may include the loading level associated with one or more geographic coverage areas within the wireless communications system 11. As used herein, a geographic coverage area may refer to a cell or a sector, for example. Although the first performance indicator and the second performance indicator represent interference rise and loading for the illustrative embodiment in FIG. 2, in other embodiments the first performance indicator, and the second performance indicator may include one or more of the following: frame-error rate, bit-error rate, signal-to-interference ratio, signal-to-noise ratio, a grade of service, and a call blocking rate.

The relative interference rise is the ratio of the total reverse link power received by the base station 10 to the estimated background noise power in the relevant receive band. The total reverse link power may include contributions from all active subscriber stations transmitting on the reverse link. The interference rise may include internal interference from transmissions of the wireless communications system and external interference from radiating sources other than the wireless communications system 11. Interference rise may be measured with reference to the background noise floor in the electromagnetic frequency range of reception of the base station 10. For example, the interference rise may be expressed as decibels above the background noise floor.

In one embodiment, at a base station site a base station 10 may measure interference rise by sampling the reverse link signal received from all or many of the currently active subscriber stations. The currently active subscriber stations may include all subscriber stations other than the subscriber station 24 seeking access to the wireless communication system. In accordance with a preferred technique, the base station 10 statistically averages receive signal strength indicator (RSSI) samples over a minimum interval to reduce the impact of instantaneous variations in the received reverse link signal caused by short-term effects, such as transient voice activity, fading of the reverse link signal, and variations in subscriber station transmit power which occur during normal operation (e.g., during access probes). The interference rise generally provides a reliable indicator of reverse link coverage in field tests. Because of a conventional power control procedure, a subscriber station may increase its transmit power on the reverse link in response to increases in the interference rise where the subscriber station tries to overcome reverse link signal degradation induced by increased interference. Because mobile transmit power is limited, above a certain interference rise, the subscriber station cannot provide enough power to achieve the target signal-to-interference ratio at the base station receiver. Thus, the subscriber station may suffer from degraded coverage that covers less of a coverage area with a benchmark statistical reliability.

The loading or loading estimate is an indicator of how much an addition of another subscriber station contributes to a change in the interference rise. The loading is defined with reference to a subject cell, sector, or geographic coverage area, of the wireless communications system 11, which may be commensurate in scope with the estimated resources required to support the addition of the subscriber station seeking access. The loading estimate allows the determination of interference contributions from internal sources and external sources. Internal interference refers to interference generated by the transmitting mobile stations or base stations in the wireless system itself, whereas external interference refers to other interference produced by sources that are not part of the wireless system. To some extent, the wireless communications system 11 may use power control to reduce or minimize internal interference.

In step S12 of FIG. 2, the base station 10 or another network element (e.g., base station controller 26 or telecommunications switch 30) establishes a blocking threshold based upon the measured second performance parameter. For example, a previous value of the blocking threshold may be based on a corresponding value of the second performance parameter at a particular instantaneous time or a particular time span during which the subscriber station 24 seeks access to the wireless communications system 11. The blocking threshold controls the extent to which access is granted or denied to an additional subscriber station 24 seeking access to the wireless communications system. The blocking threshold represents a control overload benchmark for determining whether to deny or grant the access of one or more subscriber stations to a base station 10 or the wireless communications system 11. The blocking threshold may be expressed in units such as decibels above the background noise floor, a relative signal strength relative to a reference signal strength, or an absolute signal strength.

In step S14, the base station 10 or another network element determines whether the first performance indicator is less than or equal to the established blocking threshold (established in step S12). If the first performance indicator is less than or equal to the established blocking threshold, the method continues with step S16. However, if the first performance indicator is greater than the established blocking threshold, the method continues with step S18. If the first performance indicator exceeds the blocking threshold, the wireless communications system 11 rejects new call arrivals of one or more subscriber stations to prevent coverage and/or performance degradation. The wireless communications system 11 may deny access to one or more subscriber stations 24 regardless of whether the new call is a subscriber-terminated call or a subscriber-originated call.

In an alternate embodiment, the blocking threshold represents a blocking threshold range having a minimum limit and a maximum limit, based on quality of service and other operational constraints. For example, the minimum limit and the maximum limit may be determined based on anticipated variations in the reverse link frame error rate, a dropped call rate, or both.

In step S14, the base station 10, telecommunications switch 30, base station controller 26, or another network element decides whether to grant or deny access to the subscriber station 24 seeking access to the wireless communications system 11 based on a comparison of the first performance indicator to the value of the blocking threshold. In step S16 consistent with an affirmative outcome of step S14, the wireless communications system 11 grants the subscriber station 24 access to the wireless communications system 11. In step S18 consistent with a negative outcome of step S14, the wireless communications system 11 denies the subscriber station 24 access to the wireless communications system 11. The above procedure may be repeated after a waiting time following step S18 or upon the origination of a new call to or from the subscriber station 24.

Accordingly, the foregoing method of FIG. 2 facilitates the maintenance of a desired performance, of the wireless communications system 11, such as signal quality level or statistical reliability over a desired geographic coverage area. The blocking threshold may represent a dynamically adjustable admission criteria that considers one or more performance factors in limiting access to one or more subscribers 24 to the wireless communications system 11. The method of the invention is well-suited for preventing traffic overload in a CDMA wireless system, where subscribers might otherwise experience poor signal quality under overloaded traffic conditions. If a subscriber station 24 is denied access to the wireless communications system 11, the subscriber station 24 may seek access to an alternate communications service covering the same geographic area, such as a different carrier, an umbrella cell, satellite communications service, or an analog cellular communications service. Thus, a service provider may still capture revenue from subscribers that are denied access to an overloaded wireless communications system 11 by providing an alternate communications service for such denied subscribers following step S18.

Figure 3:
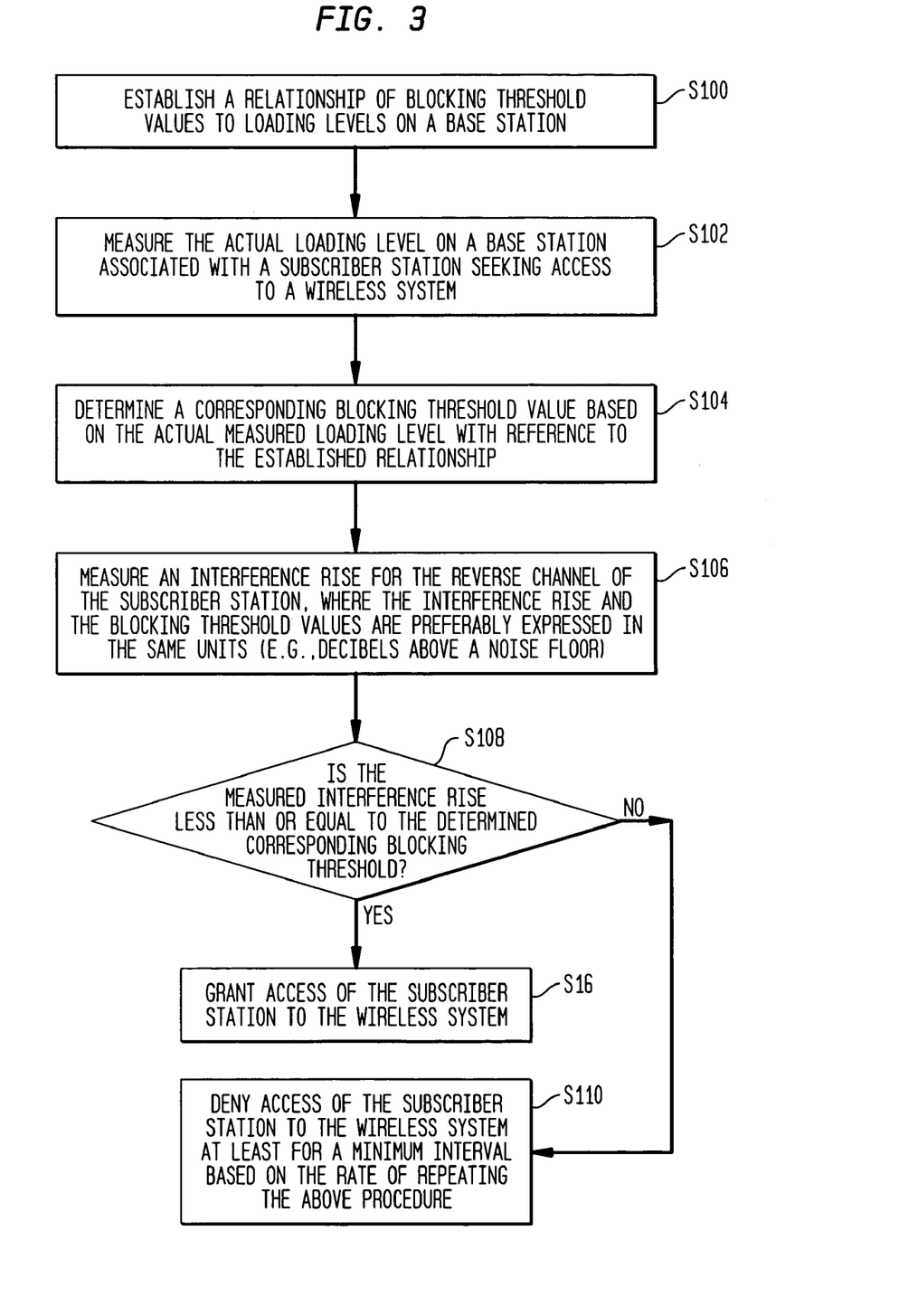
FIG. 3 is a flow chart illustrating another method for controlling access of a subscriber station to a wireless communications system in accordance with the invention.

FIG. 3 illustrates another example of a method for controlling access of subscriber station 24 to a wireless communications system 11 in accordance with the invention. The definitions of terms used to describe FIG. 2 apply equally to FIG. 3. The method of FIG. 3 begins with step S100 in which a base station 10 or another network element establishes a relationship of blocking threshold values to loading levels at a base station site. The blocking thresholds are associated with corresponding loading levels.

Figure 6:
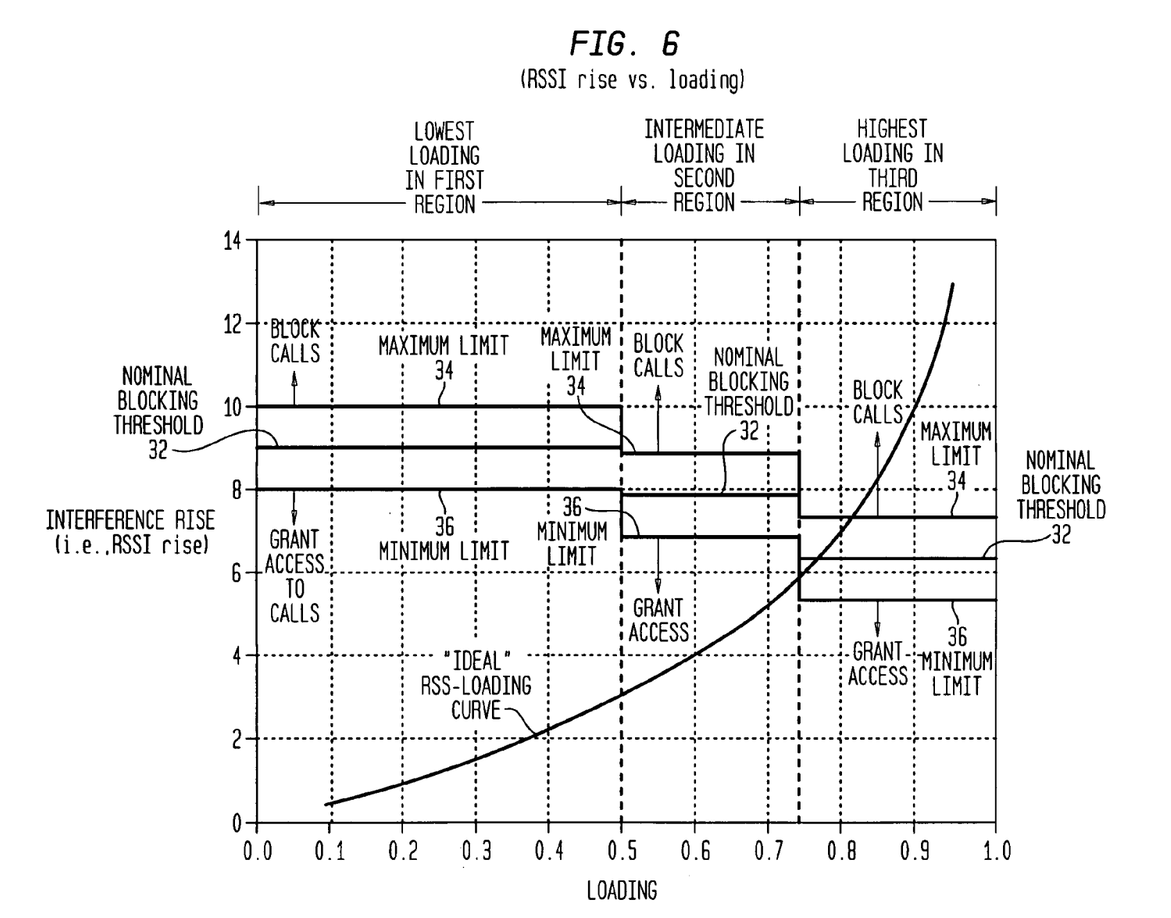
FIG. 6 is a graph of interference rise versus loading level at a base station site in accordance with the invention.

The blocking thresholds and corresponding loading levels may be described in a look-up table, a database 22, a mathematical expression, or a graphical format suitable for storage in a storage device associated with the base station 10 or another network element. In one example, the blocking thresholds and their corresponding loading levels may represent different fields in tee database 22. In another example, a relationship between blocking threshold values and loading levels may be established by a mathematical expression, such as a linear equation or a step-function. The base station 10 or another network element could store the mathematical expression in a storage device. FIG. 6 describes a graphic representation of the relationship between blocking thresholds and corresponding loading levels in greater detail.

In step S102 following step S100, the base station 10 (or another network element, such as the base station controller 26 or the telecommunications switch 30) measures the actual loading level on a coverage area of a base station 10 associated with a subscriber station 24 seeking access to a wireless communications system 11. The actual loading level is preferably commensurate in scope with the resources required to support one or more communication services for the mobile station seeking access to the wireless communications system 11.

In step S104, the base station 10 or another network element determines a corresponding blocking threshold based on the actual measured loading level with reference to the established relationship. Step S104 may entail accessing a database storing the established relationship and retrieving desired data from the database.

In step S106, the base station 10 measures an interference rise for the reverse channel of the subscriber station 24 seeking access to the wireless communications system 11. The interference rise and the blocking threshold values are preferably expressed in the same units (e.g., decibels above a noise floor) to facilitate comparison in step S108.

In step S108, a base station 10 or another network element determines if a measured interference rise is less than or equal to the corresponding blocking threshold, determined previously in step S104. If the interference rise is less than or equal to the determined corresponding blocking threshold, the method continues with step S16. If the interference rise is greater than the corresponding blocking threshold (previously determined in step S104), the method continues with step S110. In an alternate embodiment, if the interference rise is equal to the corresponding blocking threshold, the method may continue with step S110, instead of step S16.

In step S16, the wireless communications system 11 grants access of the subscriber station to the wireless system. In contrast, in step S110 the wireless communications system 11 denies access of the subscriber station 24 to the wireless communications system 11 at least for a minimum interval based on the rate of repeating the above procedure. The method of FIG. 3 provides a pragmatic technique for maintaining quality of communications service for active subscribers by controlling access of new subscribers seeking to access the wireless communications system 11 on a dynamic basis.

Figure 4:
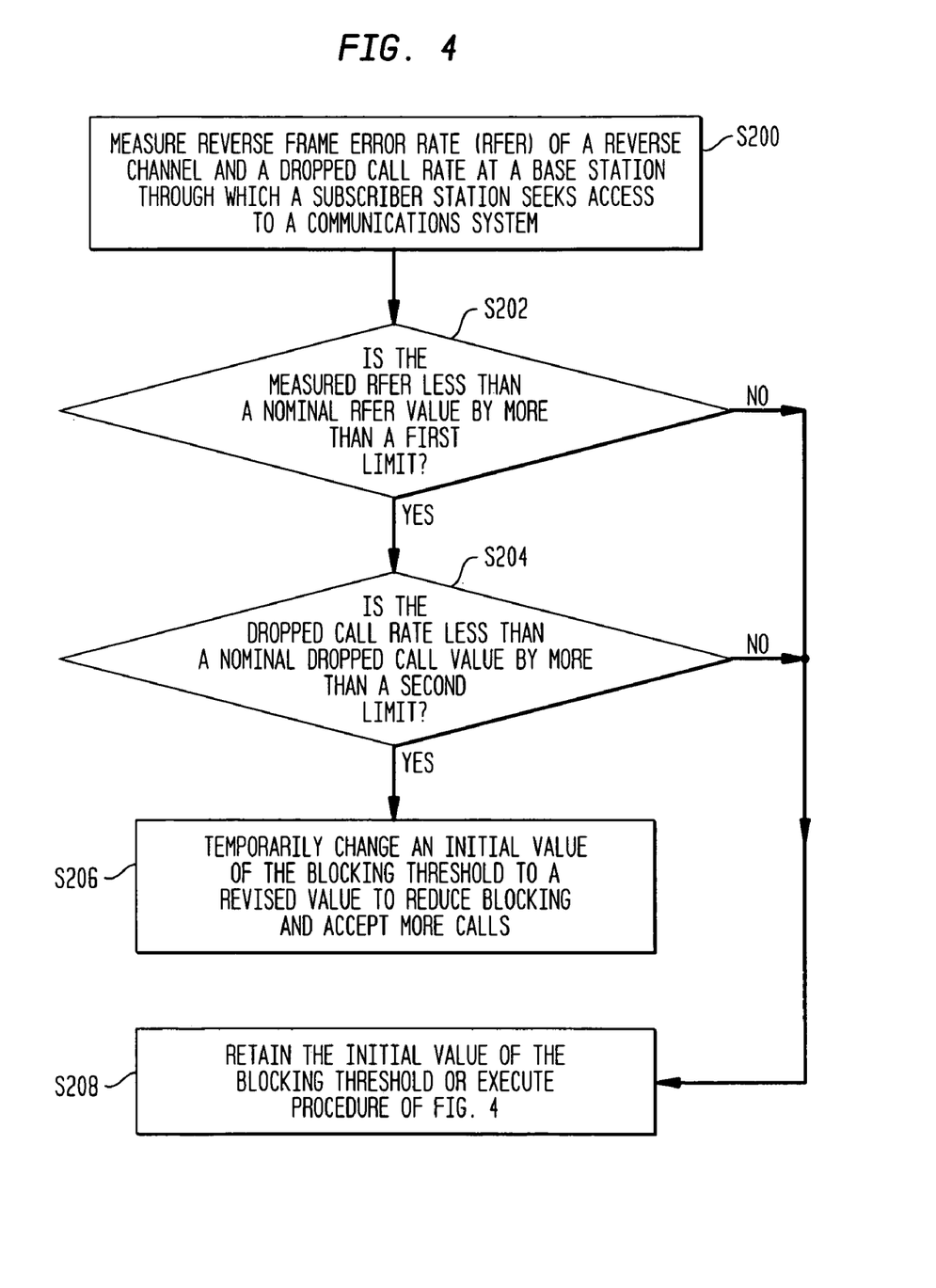
FIG. 4 is a flow chart illustrating an adjustment procedure for potentially adjusting a previous value of the blocking threshold in accordance with the invention.
Figure 5:
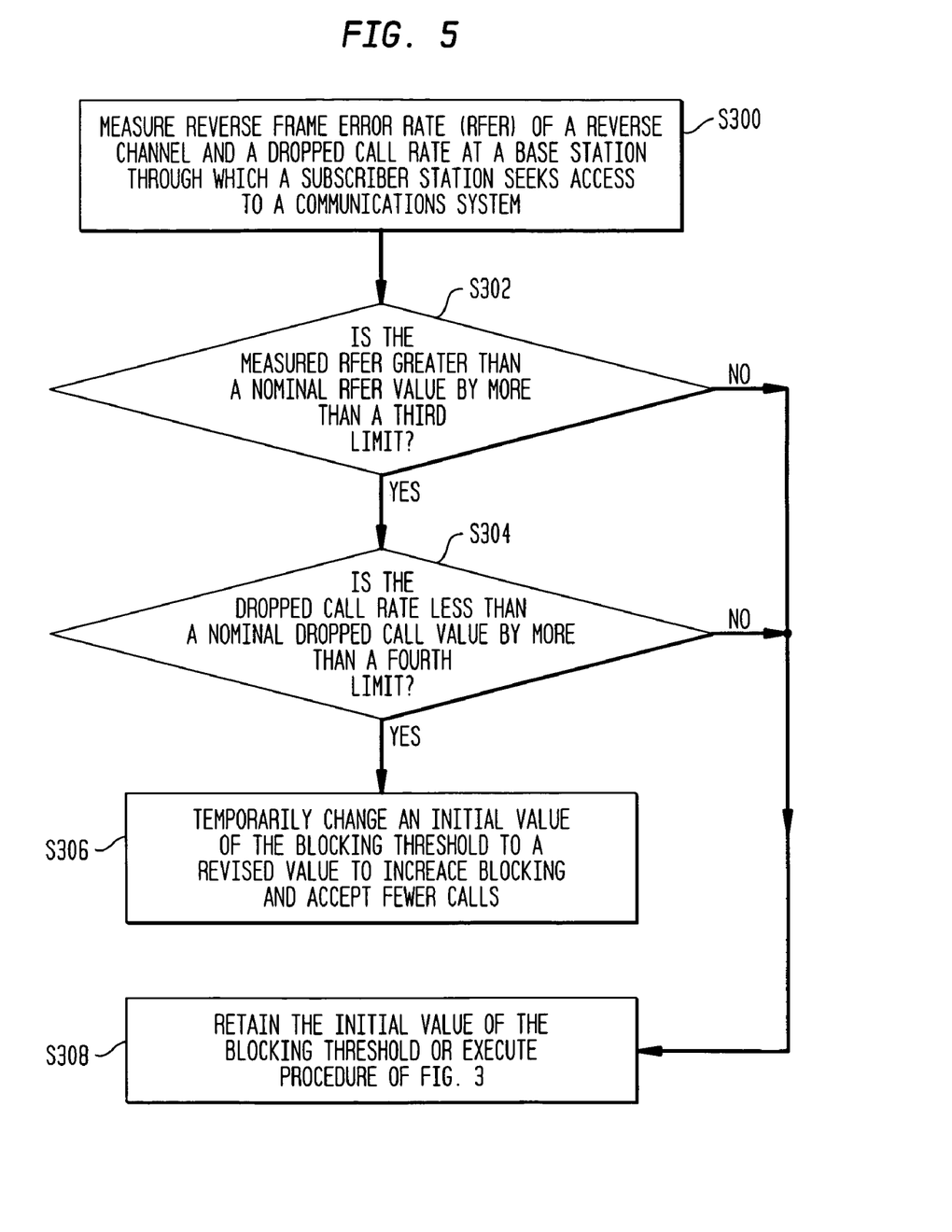
FIG. 5 is a flow chart illustrating another adjustment procedure for potentially adjusting a previous value of the blocking threshold in accordance with the invention.

FIG. 4 and FIG. 5 illustrate methods for adjusting a value of the blocking threshold to a revised value. The revised value of the blocking threshold seeks to better reflect the impact of adding an access-seeking subscriber station to the wireless system than a previous value of the blocking threshold. The method of FIG. 4 may be applied to the access method of FIG. 2 (between steps S12 and S14) or FIG. 3 (anywhere following step S104 and before step S108). Similarly, the method of FIG. 5 may be applied to the access method of FIG. 2 (between steps S12 and S14) or FIG. 3 (anywhere following steps S104 and before S108). Further, the method of FIG. 4 and FIG. 5 may be used sequentially in any order.

The method of FIG. 4 starts with step S200, which may follow step S104 of FIG. 3, for example. In step S200, the base station 10 or another network element measures the reverse frame error rate (RFER) of a reverse channel and a dropped call rate at a base station through which a subscriber station 24 seeks access to a wireless communications system 11.

In step S202, the base station 10 or another network element determines if the measured RFER is less than a nominal RFER value by more than a first limit. The nominal value of the RFER is selected to meet a target performance of statistical availability or reliability within a defined coverage area of the wireless communications system. The first limit represents a tolerance from the nominal RFER value where the actual performance is significantly improved over the target performance such that the access-seeking subscriber station may be provided with access to the wireless communications system on a more inclusive basis than otherwise warranted. If the measured RFER is less than the nominal RFER value by more than the first limit, the method continues with step S204. Otherwise, the method continues with step S208.

The nominal RFER value and the first limit may comprise operator-definable parameters that are programmable into the base station. The nominal RFER values and the first limit may be selected based on empirical measurements or other considerations. The first limit represents a tolerance or deviation, from the nominal RFER, which is regarded as significant and is consistent with maintaining reliable performance for existing active subscriber stations.

In step S204, the base station 10 or another network element determines if the dropped call rate is less than a nominal dropped call rate value by more than a second limit. The second limit represents a tolerance from the nominal dropped call rate value where the actual performance is significantly improved from the target performance such that the access-seeking subscriber station may be granted access to the wireless communications system on a more inclusive basis than otherwise warranted. If the measured dropped call rate is less than the nominal dropped call rate by more than the second limit, the method continues with step S206. Otherwise, the method continues with step S208.

The nominal dropped call rate and the second limit may comprise operator-definable parameters that are programmable into the base station. The nominal dropped call rate and the second limit may be selected based on empirical measurements or other considerations. The second limit represents a tolerance or deviation, from the nominal dropped call rate, which is regarded as significant and is consistent with maintaining reliable performance for existing active subscriber stations.

In step S206, the base station or another network element temporarily changes a previous value of the blocking threshold to a revised value to reduce blocking of new calls and to accept more new calls. For example, if the blocking threshold is defined as a desired interference rise, the base station or another network element temporarily increases a previous value of the blocking threshold to a revised value. However, in an alternate embodiment the blocking threshold may be defined as a certain signal-to-noise ratio affiliated with a base station, where the signal-to-noise ratio is temporarily decreased to grant access to additional subscriber stations seeking access to the base station. The determined blocking threshold of step S104 may be regarded as a previous value of the blocking threshold for purposes of step S206 and step S208. Accordingly, the changed blocking threshold permits the grant of access to additional subscriber stations 24 that might otherwise be denied access to the wireless communications system. Following step S206, the method may continue with step S106 of FIG. 3, for example.

In step S208, the base station 10 or another network element retains the previous value of the blocking threshold (e.g., determined in step S104 of FIG. 3) or may proceed to execute the method of FIG. 5. If the base station 10 or the other network element retains the previous value without proceeding to the method of FIG. 5, the method may continue with step S106 of FIG. 3, for example.

In an alternate embodiment of FIG. 4, the base station 10 or another network element may only measure the RFER of a reverse channel or a dropped call rate, rather than both the RFER and the dropped call rate. Further, the initial value of the blocking threshold may be changed to revised value to reduce blocking based on the RFER alone or the dropped call rate alone.

The method for FIG. 5 starts with step S300, which may follow step S104 of FIG. 3, for example. In step S300, the base station 10 measures the reverse frame error rate (RFER) of a reverse channel and a dropped call rate at a base station 10 through which a subscriber station seeks access to a communications system 11.

In step S302, the base station 10 or another network element determines if the measured RFER is greater than a nominal RFER value by more than a third limit. The third limit represents a tolerance from the nominal RFER which reflects a significant departure from the nominal RFER and indicates noncompliance with a target performance parameter, such as a statistical reliability over a defined coverage area. If the measured RFER is greater than the nominal RFER value by more than the third limit, the method continues with step S304. Otherwise, the method continues with step S308.

In step S304, the base station 10 or another network element determines if the dropped call rate is greater than a nominal dropped call rate value by more than a fourth limit. The nominal dropped call rate is consistent with meeting a target performance, such as a statistical availability or reliability of communications service over a defined coverage area. The fourth limit represents a tolerance from the nominal dropped call rate which reflects a significant departure from the nominal dropped call rate which is inconsistent with meeting the target performance parameter. If the measured dropped call rate is greater than the nominal dropped call rate by more than the fourth limit, the method continues with step S306. Otherwise, the method continues with step S308.

In step S306, the base station 10 or another network element temporarily changes a previous value of the blocking threshold to a revised value to increase the blocking of new calls and accept fewer new calls. For example, if the blocking threshold is defined as an interference rise, the base station 10 or another network element temporarily decreases a previous value of the blocking threshold to a revised value. However, in an alternate embodiment the blocking threshold may be defined as a certain signal-to-noise ratio affiliated with a base station, where the signal-to-noise ratio is temporarily increased to deny access to additional subscriber stations seeking access to the base station. Accordingly, the changed blocking threshold denies the grant of access to additional subscriber stations that might otherwise be granted access to the wireless communications system 11. Following step S306, the method may continue with step S106 of FIG. 3, for example.

In step S308, the base station 10 or another network element retains the previous value of the blocking threshold. If the base station or the other network element retains the previous value without proceeding to the method of FIG. 4, the method may continue with step S106 of FIG. 3, for example. If the method of FIG. 4 was completed immediately prior to executing the method of FIG. 5, the method does not revert back to FIG. 4. As used herein, any of the first, second, third, and fourth limits may be referred to as a specified amount.

In an alternate embodiment of FIG. 5, the base station 10 or another network element may only measure the RFER of a reverse channel or a dropped call rate, rather than both the RFER and the dropped call rate. Further, the initial value of the blocking threshold may be changed to revised value to increase blocking based on the RFER alone or the dropped call rate alone.

FIG. 6 shows an illustrative arrangement of nominal blocking thresholds bounded by corresponding minimum limits and maximum limits of blocking thresholds based on the reverse frame error rate. FIG. 6 represents an illustrative relationship between blocking threshold values and loading levels, consistent with step S100 of FIG. 3. Further, FIG. 6 provides an example of minimum limits and maximum limits of blocking thresholds that may be applied to temporarily change to a revised value of a blocking threshold step S206 of FIG. 4 and step S306 of FIG. 5. The blocking thresholds represent overload control thresholds for preventing overloading of the wireless communications system with active subscriber stations. The blocking thresholds are shown as varying versus loading in a discontinuous or step-like manner. Under an alternate technique, the overload control thresholds may continuously vary versus loading.

In FIG. 6, the vertical axis represents interference rise (i.e., RSSI rise) at a base station. The horizontal axis represents loading for a sector, a cell, or another geographic coverage region associated with the base station. The ideal RSSI-loading curve shows how interference rise increases with greater loading. The blocking threshold is preferably decreased from a highest blocking threshold at a corresponding lowest loading level to a lowest blocking threshold at the corresponding highest loading level, because addition of a user at a lower loading level results in a smaller increase in the interference rise than at a high loading level. Therefore, the impact of performance of the existing subscriber stations is less for lower loading levels.

As illustrated in FIG. 6, the blocking threshold is decreased in three steps from a lowest loading range in a first region, to an intermediate loading range in a second region, to a highest loading range in a third region. However, in an alternate embodiment the blocking threshold may be decreased as a linear function or a continuous curve. The first, second, and third regions are separated by the dashed lines in FIG. 6.

A base station 10 or another network element may estimate loading on the wireless communications system in the accordance with various alternative techniques. Once the loading level is estimated, the nominal blocking threshold may be determined from a look-up table based on FIG. 6, for example. The different alternative techniques for estimating loading tend to vary in their degree of accuracy and implementation complexity.

Under a first technique, given a number of primary traffic Walsh code channels used in the cell, channel rates, voice activity (measured or assumed), and other cell interference, the loading may be estimated as a percentage of the system's pole capacity. Pole capacity ($N_{pole}$) is defined as the maximum number of users that the system could support if subscriber stations had infinite power. Under the first technique, loading may be expressed in accordance with the following mathematical expression:

$$L = N/N_{pole},$$

where $N_{pole}$ is pole capacity, and L is loading. This technique assumes that users are approximately identical with respect to transmission rate (e.g., vocoder rate), voice activity, target channel quality and radio frequency (or microwave) propagational environment.

Under a second technique, given the time-domain interference rise data (Rise(t)) and time-domain Walsh code usage data (WC(t))(the reverse link voice activity time variation for each user can possibly be included into WC(t) corresponding to that user), the parametric fit of these data sets over the fixed time period could be performed according to the following model:

$$\text{Rise}(t) = rv(t) + A/(1 - WC(t)*B),$$

where Rise(t) is measured interference rise (e.g., data of RSSI levels) as a function of time, rv(t) is a generally random clutter contribution to the measured interference rise in an electromagnetic propagational environment of the wireless communications system, A is an estimated external interference indicator, B is an internal loading or an internal interference indicator, WC(t) is time-domain Walsh code data. The foregoing equation is usually solved to determine B, where the other variables are known. Depending on the relative strength of the parameters A and B that give the best fit (i.e., when the contribution from rv(t) is minimized), it is determined whether the interference in the cell is produced by internal loading (strong B contribution), or by external sources (strong A contribution). In accordance with the second technique, the loading is estimated according to the following mathematical expression:

$$L = WC(t)*B,$$

where L is loading, WC(t) is time-domain Walsh code data, and B is a factor representing internal interference or the strength of an internal loading contribution from the wireless communication system itself. For example, internal loading contributions represent interference and noise contributions from other subscriber stations and base stations transmitting in the wireless communications system. In practice, once Rise(t)=rv(t)+A/(1−WC(t)*B) is solved for B, the resultant value of B may be applied to L=WC(t)* B to determine the loading L.

Under a third technique, the cell site monitors incremental change in RSSI rise with arrival or departure of mobiles (characterized by the change in the number of Walsh codes used). Accordingly, under the third technique, loading may be estimated by the following mathematical expression:

$$L = \frac{WC \cdot \frac{\partial Rise}{\partial WC}}{Rise + WC \cdot \frac{\partial Rise}{\partial WC}},$$

where δWC is a change in a number of Walsh codes supporting currently active subscriber stations, δRise is a change in interference level with the arrival or departure of the currently active subscriber stations, WC is a reference measurement of the number of active Walsh codes for a particular base station supporting the currently active subscriber stations, and Rise is a reference measurement of the interference level for the particular base station. WC and Rise are time-dependent and may be expressed as functions of time.

Under a fourth technique, given the signal-to-noise ratio Eb/No estimates for each subscriber station and their voice activity obtained from the channel elements of the base station, the same cell loading $L_s$ (or self-loading) is first estimated in accordance with the following equation:

$$L_s = \sum_{k=1}^{N} \frac{G_k^{-1} v_k (E_b/N_0)_k}{1 + G_k^{-1} v_k (E_b/N_0)_k}$$

where N is the number of active subscriber stations using the cell, $G_k$ is the processing gain of the kth subscriber station, $V_k$ is the voice activity of the kth user, and Eb/No is the signal-to-noise ratio for the kth subscriber station. This self-loading $L_s$ is adjusted for the other cell interference either through an assumed factor or by measurements to obtain the loading L.

Any of the above techniques may be used to estimate loading on the base station 10 such that the nominal blocking threshold may be determined from FIG. 6 or another established relationship between loading and the nominal blocking threshold. The nominal blocking threshold may be adjusted or determined through the application of a combination of theoretical and empirical relationships, based on field and simulation data, with due consideration of system implementation constraints.

Although the nominal blocking threshold may represent a static value that depends upon loading, in FIG. 6 the nominal blocking threshold 32 in any of the three regions may be adjusted between a maximum limit 34 and a minimum limit 36, consistent with maintaining a target performance of the wireless communications system. The use of a temporary blocking threshold other than the nominal blocking threshold 32 may be determined by reverse link frame error rate (RFER) and/or a dropped call rate being observed by a base station serving the subject geographic area. The temporary blocking threshold has a value within the minimum and the maximum limits (34, 36). Thus, a measured interference rise may be compared to a nominal blocking threshold value or a temporary blocking threshold value to determined whether to grant access to a subscriber station 24 seeking access to the base station 10. As used herein, the term blocking threshold value shall include a temporary blocking threshold value, a nominal blocking threshold value, or both.

RFER and the dropped call rate represent metrics for tracking the performance of the reverse link signal for active subscriber stations. The RFER and dropped call rate are indicators of the quality of service for one or more existing subscriber stations. If the RFER and/or the dropped call rate parameters indicate acceptable level of performance, the base station can relax the nominal blocking threshold value 32 to allow more calls and subscriber stations to access the wireless system. The RFER parameter could be derived as an average over all subscriber stations connected to a base station serving cell or a sector, or the RFER could be based on the RFER measurements associated with the worst RFER value for an individual subscriber station or the aggregate worst RFER based on a group of subscriber stations.

The dropped call rate and the reverse link frame error rate (RFER) may be determined with reference to a sector, a cell, or another geographic coverage area associated with a base station of the wireless communications system. If one or more subscriber stations lack an acceptable RFER level or if the subject base station 10 has a higher dropped call rate, the foregoing subscriber stations, served by the subject base station, may be transmitting from a localized area of poor coverage or a dead spot. The RFER and the dropped call rate facilitate considering the impact of adding one or more subscriber stations into a highly loaded wireless communications system, where the addition of new subscriber stations has a stronger impact than for a lightly loaded system for the same change in the loading.

The base station may use the additional performance parameters, such as RFER and/or dropped call rate, all of the time or where the loading on the wireless system or the base station exceeds some predetermined triggering threshold. The predetermined triggering threshold may be based on empirical measurements or other considerations. If the activity on the system exceeds the predetermined triggering threshold, the risk of triggering power control instability is higher. At high loading, contributions from individual mobiles are strongly coupled via power control and are not statistically independent. Therefore, both interference rise and loading estimates have a higher degree of inaccuracy in this operating region. This consideration justifies the use of the additional performance parameters to improve computation of the blocking threshold value.

This specification describes various illustrative embodiments of the method of the invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features which are consistent with the spirit and scope of the invention disclosed herein.

What is claimed is:

1. A method for controlling access of a subscriber station to a wireless communications system, the method comprising the steps of:
    obtaining a first performance indicator and a second performance indicator for a reverse link associated with a subscriber station seeking access to the wireless communications system, the first and second performance indicators indicating different types of performance;
    establishing a blocking threshold value based on the second performance indicator; and
    deciding whether to grant or deny access to the subscriber station seeking access to the wireless communications system based on a comparison of the first performance indicator to the obtained blocking threshold value.

2. The method according to claim 1 wherein the deciding step comprises denying access to the subscriber station if the first performance indicator exceeds the blocking threshold value to prevent degradation of performance of the wireless communications system.

3. The method according to claim 1 wherein the deciding step comprises granting access to the subscriber station if the first performance indicator is less than or equal to the blocking threshold.

4. The method according to claim 1 wherein the obtaining step comprises obtaining an interference rise over the thermal noise floor as the first performance indicator and loading as the second performance indicator; the interference rise over the thermal noise floor being a ratio of the total reverse link power received by a base station to the estimated thermal noise power in the receive band and the loading indicating how much each subscriber station contributes to interference.

5. The method according to claim 1 further comprising the step of obtaining at least one of the reverse link frame error rate and dropped call rate to modify a value of the blocking threshold for use in the deciding step.

6. The method according to claim 1 wherein the establishing step comprises establishing a blocking threshold range defined by a maximum blocking threshold, a minimum blocking threshold, wherein the maximum blocking threshold and the minimum blocking threshold are determined based on estimated variation in the reverse frame error rate associated with the subscriber station.

7. The method according to claim 1 wherein the obtaining step obtains a loading estimate as the second performance indicator and wherein the loading estimate includes interference contributions from subscriber stations in a subject cell and interference contributions from subscriber stations in other surrounding cells.

8. The method according to claim 1 wherein the adjusting step further comprises:
dynamically adjusting the blocking threshold value based on a loading estimate of a base station and at least one metric reflecting performance of active subscriber stations using resources of the base station.

9. The method according to claim 1 wherein the adjusting step further comprises:
dynamically adjusting the blocking threshold value based on at least one of reverse link frame error rate (RFER) observed at a base station and a dropped call rate being observed at the base station.

10. The method according to claim 1 wherein the adjusting step further comprises:
relaxing the blocking threshold to allow more subscriber stations to access the wireless communications system if a reverse link frame error rate (RFER) and a dropped call rate indicate an acceptable level of performance of the wireless communications system.

11. The method according to claim 4 wherein the adjusting step further comprises:
refining the adjustment of the blocking threshold value with reference to at least one additional performance indicator in addition to the interference rise and the loading if the loading on the wireless communications system exceeds a predetermined triggering threshold.

12. A method for controlling access of a subscriber station to a wireless communications system, the method comprising the steps of:
establishing a relationship of blocking threshold values to loading levels on a coverage area of a base station;
measuring an actual loading level on the base station associated with a subscriber station seeking access to a wireless communications system;
determining a corresponding a blocking threshold value based on the measured actual loading level with reference to the established relationship;
measuring an interference rise for the reverse channel of the subscriber station; and
deciding whether to grant or deny access to the subscriber station seeking access to the wireless communications system based on a comparison of the the measured actual loading level to the determined blocking threshold value.

13. The method according to claim 12 wherein the deciding step comprises denying access to the subscriber station if the measured actual loading level exceeds the determined blocking threshold value to prevent degradation of performance of the wireless communications system.

14. The method according to claim 12 wherein the deciding step comprises granting access to the subscriber station if the measured actual loading level is less than or equal to the determined blocking threshold.

15. The method according to claim 12 wherein the interference rise indicates a rise over the thermal noise floor being a ratio of the total reverse link power received by a base station to the estimated thermal noise power in the receive band and the measured actual loading level indicates how much each subscriber station contributes to interference.

16. The method according to claim 12 further comprising the step of obtaining at least one of the reverse link frame error rate and dropped call rate to modify the blocking threshold from a previous value to a revised value for use in the deciding step.

17. The method according to claim 12 further comprising the steps of:
measuring a reverse frame error rate of a reverse channel and a dropped call rate at the base station through which a subscriber station seeks access to the wireless communications system;
temporarily increasing a previous value of the blocking threshold to a revised value for use in the deciding step if the measured reverse frame error rate is less than a nominal reverse frame error rate by more than a specified amount and if the measured dropped call rate is less than a nominal dropped call value by more than a specified amount.

18. The method according to claim 12 further comprising the steps of:
measuring a reverse frame error rate of a reverse channel and a dropped call rate at the base station through which a subscriber station seeks access to the wireless communications system;
temporarily decreasing a previous value of the blocking threshold to a revised value for use in the deciding step if the measured reverse frame error rate is greater than a nominal reverse frame error rate by more than a specified amount and if the measured dropped call rate is greater than a nominal dropped call value by more than a specified amount.

19. The method according to claim 12 wherein the actual loading level is estimated according to the following mathematical expressions:

$$\text{Rise}(t) = rv(t) + A/(1 - WC(t)*B), \text{ and}$$

L=WC(t)* B, where Rise(t) is measured interference rise as a function of time, rv(t) is a generally random clutter contribution to the measured interference rise in a propagational environment of the wireless communications system, A is an estimated external interference indicator, B is an internal interference indicator, WC(t) is time-domain Walsh code data, and L is loading.

20. The method according to claim 12 wherein the actual loading level is estimated according to the following mathematical expression:

$$L = \frac{WC \cdot \frac{\partial Rise}{\partial WC}}{Rise + WC \cdot \frac{\partial Rise}{\partial WC}},$$

where δWC is a change in a number of Walsh codes supporting currently active subscriber stations, δRise is a change in interference level with the arrival or departure of the currently active subscriber stations, WC is a reference measurement of the number of active Walsh codes for a particular base station supporting the currently active subscriber stations, and Rise is a reference measurement of the interference level for the particular base station.

21. A system for controlling access of a subscriber station to a wireless communications system, the system comprising:
- a reverse-link performance measurer for measuring a signal performance indicator associated with the reverse link transmission of the subscriber station;
- a loading detector for detecting the loading level of the channels served by the base station;
- a database for storing a desired relationship of a desired signal performance indicator value to a desired loading level; and
- a blocking manager deciding whether to grant access of the subscriber station to the wireless communications system based on a comparison of the measured signal performance indicator and the detected loading level to the desired relationship.

22. The system according to claim 21 wherein the measured signal performance indicator comprises an interference rise level estimated from granting access of the subscriber station to the wireless communications system.

23. The system according to claim 21 wherein the detected loading level represents a ratio of the active channels of a base station to the available channels of the base station.

24. A method for controlling access of a subscriber station to a wireless communications system, the method comprising the steps of:
- obtaining a first performance indicator and a second performance indicator for a reverse link associated with a subscriber station seeking access to the wireless communications system, at least one of the first and second performance indicators not indicating an interference level;
- establishing a blocking threshold value based on the second performance indicator; and
- deciding whether to grant or deny access to the subscriber station seeking access to the wireless communications system based on a comparison of the first performance indicator to the obtained blocking threshold value.

* * * * *